US006862201B2

(12) United States Patent
Hodge, Jr.

(10) Patent No.: US 6,862,201 B2
(45) Date of Patent: Mar. 1, 2005

(54) METHOD AND CIRCUITRY FOR ACTIVE INRUSH CURRENT LIMITER AND POWER FACTOR CONTROL

(75) Inventor: Stuart I. Hodge, Jr., Palm Coast, FL (US)

(73) Assignee: Delta Energy Systems (Switzerland) AG, Bern-Bumplitz (CH)

( * ) Notice: Subject to any disclaimer, the term of this patent is extended or adjusted under 35 U.S.C. 154(b) by 197 days.

(21) Appl. No.: 09/749,354

(22) Filed: Dec. 27, 2000

(65) Prior Publication Data

US 2002/0080630 A1 Jun. 27, 2002

(51) Int. Cl.[7] ............................................... H02M 5/42
(52) U.S. Cl. ........................................ 363/89; 323/908
(58) Field of Search ................................ 323/299, 303, 323/908, 222, 223, 224, 225, 226, 266, 268; 363/50, 53, 89, 20, 21.01

(56) References Cited

U.S. PATENT DOCUMENTS

| 4,628,431 A | 12/1986 | Kayser | 363/49 |
|---|---|---|---|
| 4,864,482 A | 9/1989 | Quazi et al. | 363/37 |
| 4,949,234 A | 8/1990 | Gulczynski | 363/48 |
| 4,956,760 A | 9/1990 | Gulczynski | 363/16 |
| 5,010,293 A | 4/1991 | Ellersick | 323/278 |
| 5,012,161 A | 4/1991 | Borowiec et al. | 315/247 |
| 5,087,871 A | 2/1992 | Losel | 323/299 |
| 5,107,151 A * | 4/1992 | Cambier | 327/432 |
| 5,122,724 A | 6/1992 | Criss | 323/222 |
| 5,283,707 A | 2/1994 | Conners et al. | 361/58 |
| 5,374,887 A | 12/1994 | Drobnik | 323/299 |
| 5,420,780 A * | 5/1995 | Bernstein et al. | 363/89 |
| 5,519,264 A | 5/1996 | Heyden et al. | 307/125 |
| 5,559,660 A | 9/1996 | Watson et al. | 361/58 |
| 5,619,127 A | 4/1997 | Warizaya | 323/275 |
| 5,675,276 A * | 10/1997 | Goel | 327/205 |
| 5,689,394 A * | 11/1997 | Esser et al. | 361/56 |
| 5,715,154 A | 2/1998 | Rault | 363/89 |
| 5,835,365 A | 11/1998 | Lee | 363/49 |
| 5,886,892 A | 3/1999 | Radley et al. | 363/126 |
| 5,894,396 A | 4/1999 | Kim | 361/103 |
| 5,900,683 A * | 5/1999 | Rinehart et al. | 307/129 |
| 5,920,186 A | 7/1999 | Ninh et al. | 323/908 |
| 5,930,130 A | 7/1999 | Katyl et al. | 363/53 |
| 5,973,942 A * | 10/1999 | Nelson et al. | 363/50 |
| 6,275,395 B1 * | 8/2001 | Inn et al. | 363/60 |

FOREIGN PATENT DOCUMENTS

EP  0 591 915 A2  4/1994

OTHER PUBLICATIONS

Sutanto et al, "A New boost power factor pre-regulator", IEEE 1999 International Conference on Power Electronics and Drive Systems, PEDS '99, pp. 915–920.*

* cited by examiner

*Primary Examiner*—Gary L Laxton
(74) *Attorney, Agent, or Firm*—Gallagher & Kennedy, P.A.; Thomas D. MacBlain

(57) ABSTRACT

A power supply circuit comprising an active power factor correction circuit. The active power factor correction circuit comprises a controller for controlling both the power factor correction and the inrush current control circuit. The inrush control circuit comprises at least one insulated gate bipolar transistor (IGBT) connectable to the controller.

10 Claims, 10 Drawing Sheets

METHOD AND CIRCUITRY FOR ACTIVE INRUSH CURRENT LIMITER AND POWER FACTOR CONTROL

BACKGROUND OF THE INVENTION

1. Field of the Invention

The present invention relates to active inrush current circuits and, more particularly, to active inrush current circuits in power factor correction control circuitry.

2. Prior Art

Power supplies connected to an AC line voltage supply, are often subjected to short-duration, high amplitude, input current (known as inrush current). The inrush current may be many times the steady state current until the power supply reaches equilibrium, i.e., the transient effect continues until the voltage across the internal power supply capacitance reaches a voltage approximately equal to the peak amplitude of the AC line voltage supply. If uncontrolled, the inrush current can result in internal power supply capacitance absorbing energy beyond its rated value as well as subjecting power supply components to damaging current levels.

One approach to controlling inrush current uses a relay as the current control device. FIG. 1 shows one implementation of inrush current control using a relay. At first application of the AC mains voltage, the current to charge the output capacitor Cout is limited through the resistor, RLIM. The AC line is rectified by diode bridge DB1. The decision to close the relay originates in inrush control block K2. The control function could be that the voltage impressed on Cout has stopped rising.

the inrush control block K2 could also monitor the peak value of the input voltage and compare that to the output voltage on Cout and close the relay when the difference is within a predetermined range. When this occurs, inrush current has decayed to normal operating levels and the relay K1 can be closed by a control signal from the UPFC IC with minimal or no surge current through the relay K1. At this point, down stream converters, whether PFC Boost converters or just load DC/DC Converters can be enabled. In the case of the PFC, the control circuit will limit the input current used to charge a bulk capacitor above the input voltage to the regulation point. Although not shown here, many times a second comparator is used to detect that the output voltage is charged to a predetermined minimum level, i.e. the peak AC input at low line; this signal may be logically combined with the inrush control block K2 to control the relay K1 turn-on. However, it is readily apparent that during shutdown, or line dropouts the relay will not open until the output voltage is lower than the input voltage or the absolute value of the output voltage is below a preset minimum. In addition, it is often desired that the circuit detect cycle drops and maintain operation. However, if the applied AC is at high-line, a cycle drop-out could lead to high surge currents, especially if the Boost power supply is still running. The only current limiting functions would be the series resistance of the circuit through the output capacitor Cout. For example, if with a bulk voltage Vbulk of 150VDC, a peak line voltage of 350VAC, and a series resistance of 1 ohm, the surge current could easily reach hundreds of amperes destroying many of the power supply components. It is also readily appreciated that many relays have pull-in/drop-out times measured in milli-seconds. This slow reaction time can cause the same problems as discussed above.

Another method for controlling inrush current is to use a series connected negative temperature coefficient (NTC) resistive device. The NTC will limit inrush at start-up, but once it's hot, the resistance is low until the device has had time to cool. Thus, in situations where power cycles on and off before the device has had time to cool, there will be minimal, if any, inrush current protection.

Another circuit for controlling inrush current may use a silicon controlled rectifier (SCR). Referring to FIG. 2, a circuit schematic implementing an SCR based inrush current control scheme is shown. This circuit uses an SCR bridge X1,X2 with separate diodes and resistors for the inrush path. Inrush is sensed as in the circuit of FIG. 1 and the gates of the SCRs X1,X2 are modulated on or off by the inrush control block 20. It is readily appreciated that the SCRs can transition from full on to full off and back again in microseconds, as opposed to the slower milliseconds response of the relay approach to controlling inrush current. The disadvantage, however, is that two otherwise low forward drop diodes are replaced with two high forward voltage drop SCRs. These components are in the path of the input current, which is the highest average current path in the boost converter, resulting in an adverse effect on efficiency. In addition, drive for the SCRs are another disadvantage. The most conventional approach drives the SCRs with a current source equivalent. The gate loss in this case can be high. Moreover, the benefit to placing the SCR in the input current path is that the current is essentially continuous and drive is only needed around the zero crossing. This will be true for all conditions that keep the minimum holding current of the SCR flowing. But, the holding capability of the SCR can cause delay in the turn-off response time of the circuit.

Power metal oxide silicon field effect transistor (MOSFET) are also often used as current control switches. However, power MOSFETs have many undesirable features such as conduction characteristics that are strongly dependent on temperature and voltage ratings. Moreover, MOSFETs are largely insensitive to MOSFET gate voltages, and for large values of drain current, the drain to source voltage is primarily a linear function of the drain current. This resistive effect limits the usefulness of MOSFETs to low current applications.

SUMMARY OF THE INVENTION

In accordance with one embodiment of the invention a power supply circuit is provided. The power supply circuit comprises an active power factor correction circuit having a controller. The controller output controls both the power factor correction and the inrush current control circuit. The inrush control circuit comprising at least one insulated gate bipolar transistor (IGBT) connectable to the controller.

In accordance with another embodiment the invention includes a method for controlling inrush current in a power factor correction control circuit. The method comprises the steps of passively controlling inrush current with a passive device and generating a power factor control signal. The method continues with the steps of implementing the power factor control signal to actively control inrush current, wherein actively controlling inrush current shunts output current around the passive device and through an active device.

Another embodiment of the invention is directed towards an active current inrush limiting circuit for controlling surge current in a power factor correction control system. The circuit comprises a passive current limiting device and a controller. The controller is adapted to controlling a power factor correction control circuit and an active current limiting device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
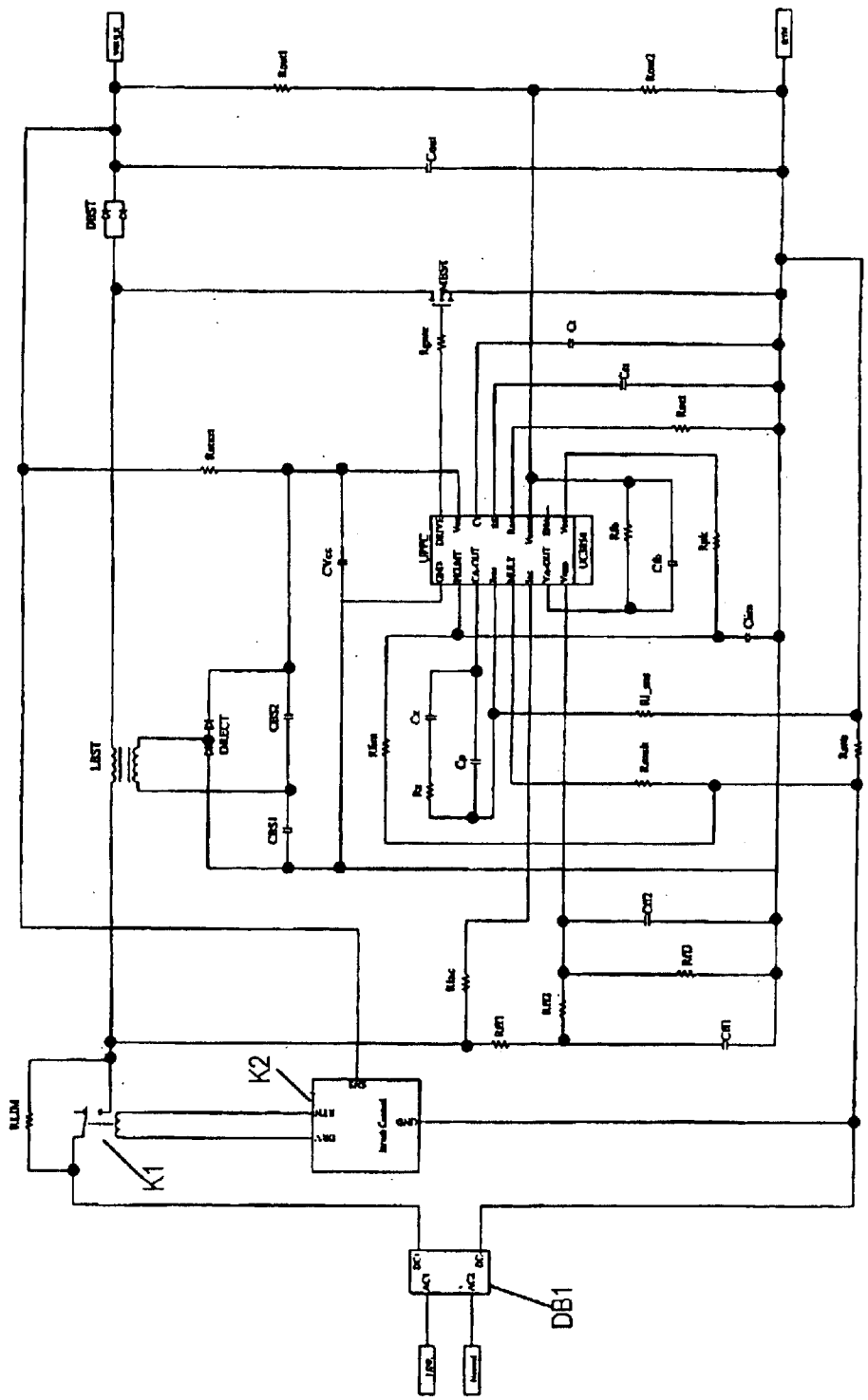
FIG. 1 is a schematic diagram of a power supply circuit using relay based inrush current control.
Figure 2:
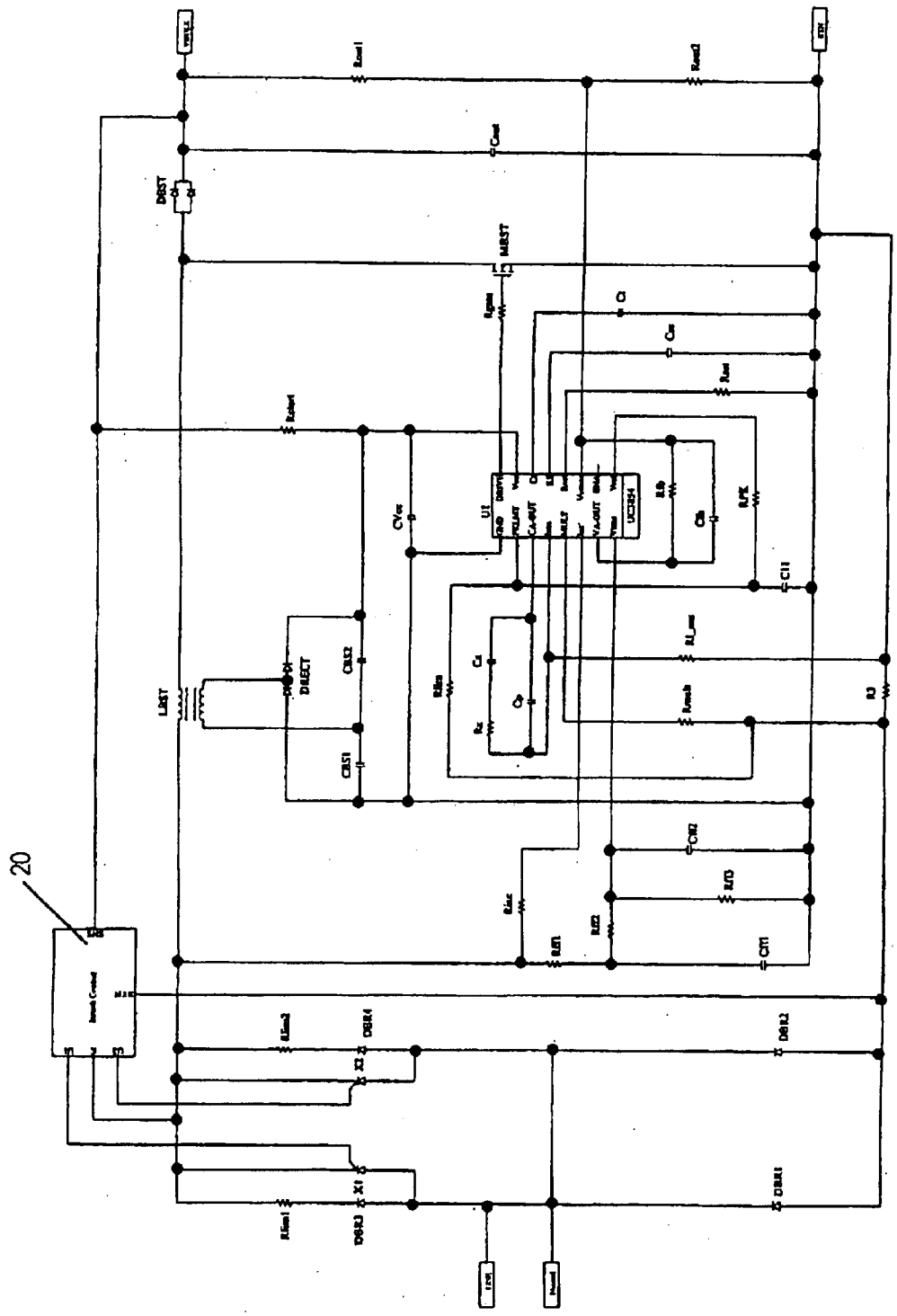
FIG. 2 is a schematic diagram of a power supply circuit using SCR based inrush control.

Although the present invention will be described with reference to the embodiments shown in the drawings, it should be understood that the present invention can be embodied in many alternate forms of embodiments.

Figure 3:
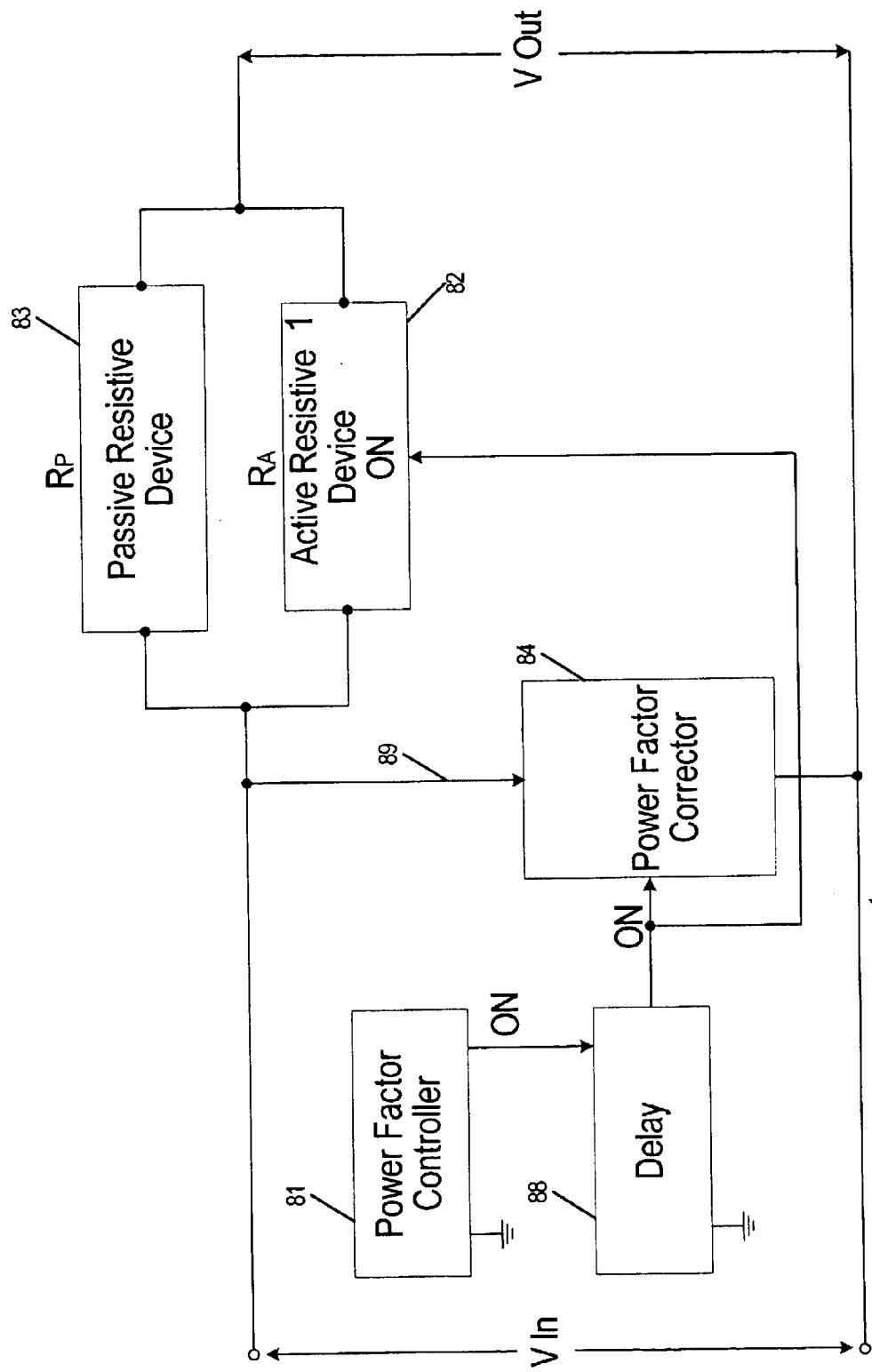
FIG. 3 is a block diagram of an inrush current control circuit incorporating features of the present invention.

Referring now to FIG. 3 there is shown a simplified block diagram of a power factor control circuit with inrush current control 85. As shown at 89 in FIG. 3, a power factor corrector circuit 85 is supplied operating power at 89 taken from the input voltage. During startup current is applied to the parallel resistance of passive resistive device 83 in parallel with the active resistive device 82. The active resistive device 82 is not yet turned on due to the delayed on signal from power factor controller 81 through delay 88. Thus, the active resistive device 82 presents a very high resistance in comparison to the passive resistive device 83 such that current flow is substantially through the passive resistive device 83 for the period of delay determined by delay block 88. Note that delay may be a dedicated delay circuit or, alternatively, may be inherent delay caused by circuit component 81. After the predetermined delay, an on signal turns on the power factor corrector 84 and the active resistive device 82; which in turn allows current to flow through the active resistive device 82. The effective resistance of the parallel combination of the passive resistive device 83 and the active resistive device is determined by the effective resistance of the active resistive device 82 in the on state in parallel with passive resistive device. Advantageously, the resistance of the active resistive device 82 in the on state is very low with respect to the resistance of the passive device 83.

Figure 4A:
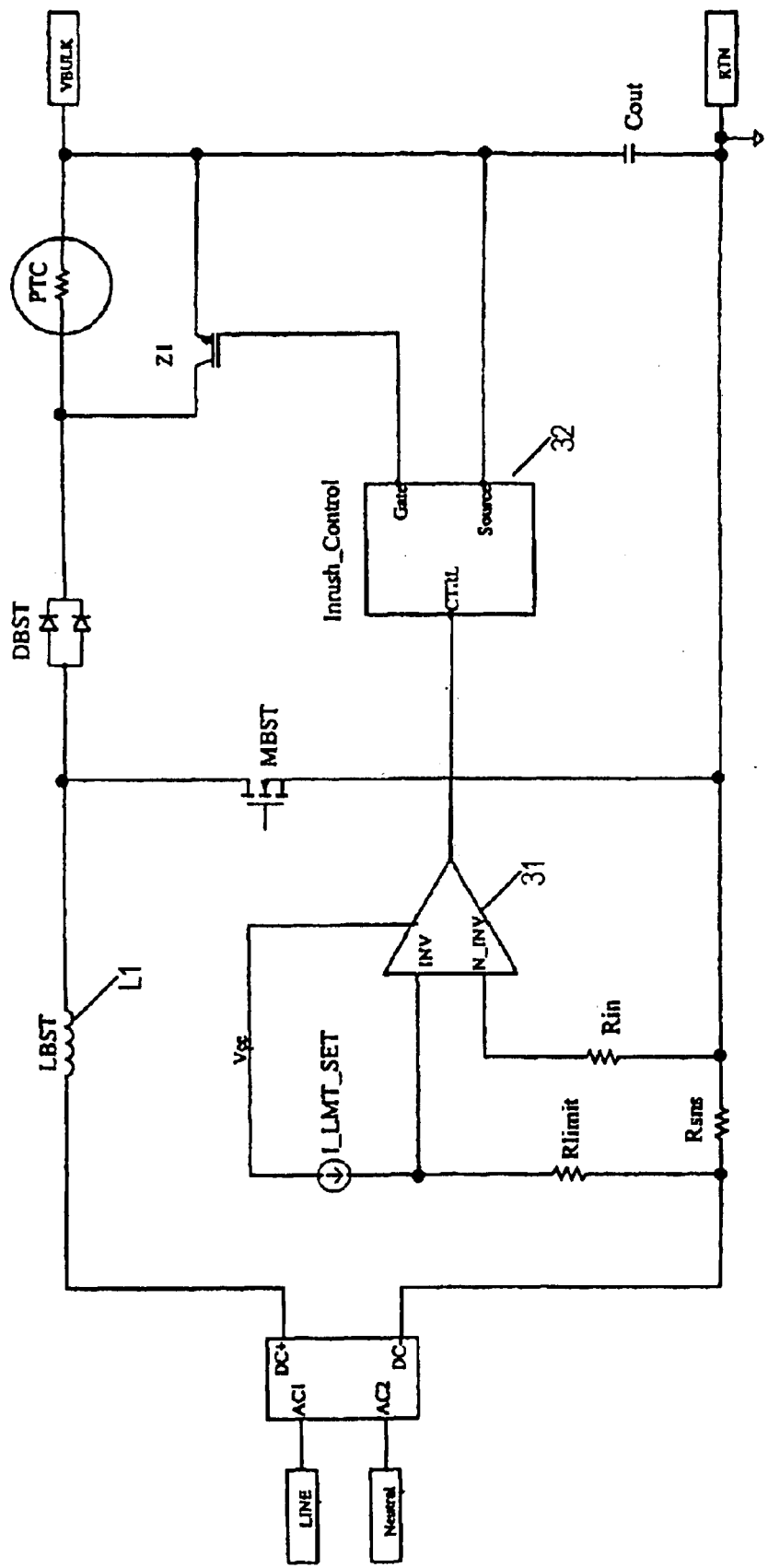
FIG. 4A is a schematic diagram of one implementation of the invention shown in FIG. 3.
Figure 4B:
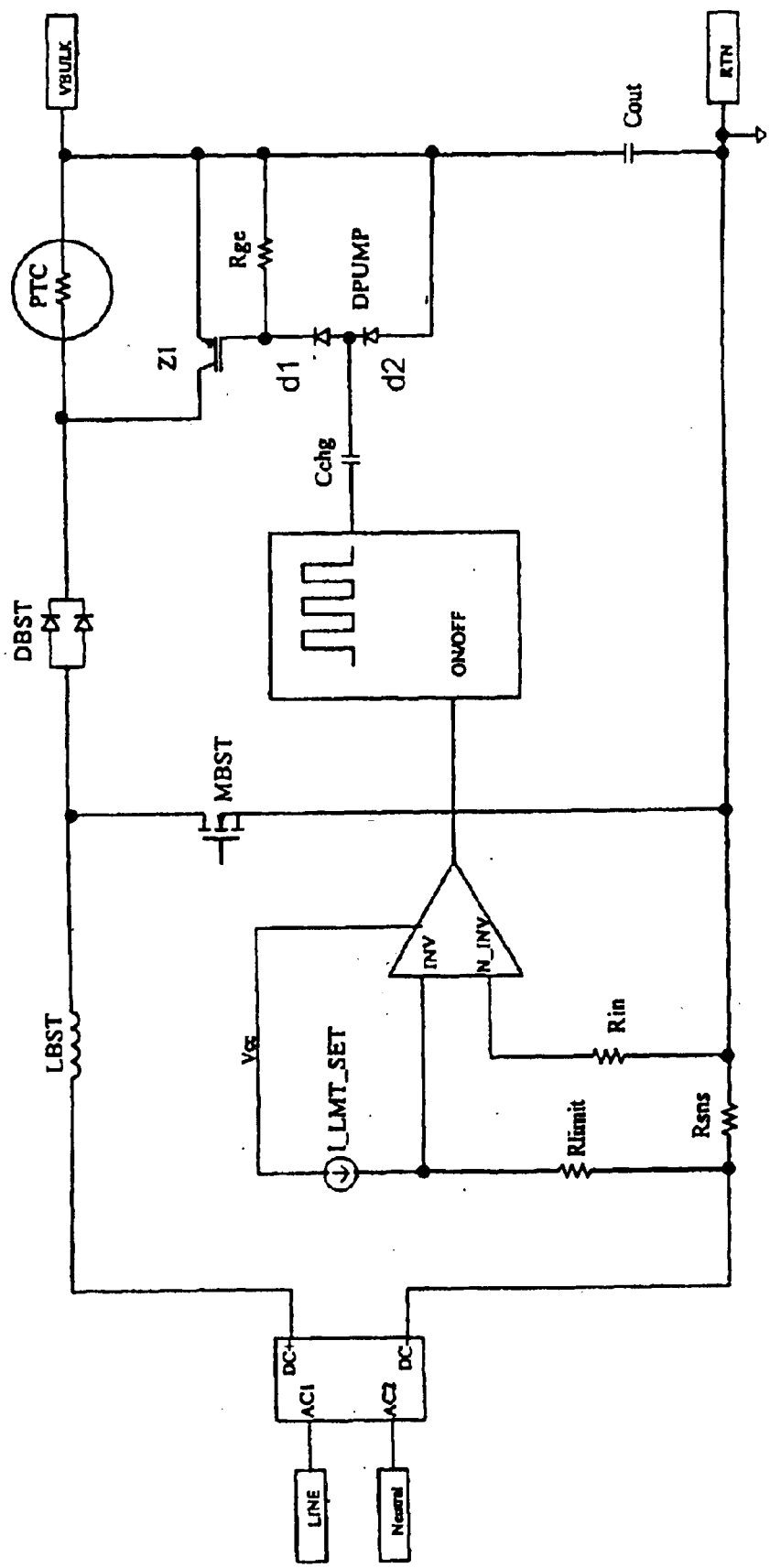
FIG. 4B is a schematic diagram of another implementation of the invention shown in FIG. 3.

Referring now to FIG. 4A there is shown an inrush current control circuit incorporating features of the present invention. This circuit uses a current sense resistor Rsns used for PFC current shaping circuits. The comparator 31, with hysteresis, controls a drive system 32 for an active device, an insulated gate bipolar transistor (IGBT), Z1 connected in series with the boost inductor L1. When an over current condition is reached the IGBT Z1 is turned off, and, when the current drops below the hysteresis point, the IGBT turns back on. It can be readily appreciated that the hysteresis level is set above the maximum steady state current. The drive signal for the IGBT gate is at a higher voltage potential than the IGBT emitter. This can be achieved either with a transformer-coupled drive or a charge pump design as shown in FIG. 4B by diodes d1,d2 and capacitor Cchg. This approach allows the IGBT to be fully on during normal mode operation and still be able to turn it off during faults.

Figure 4C:
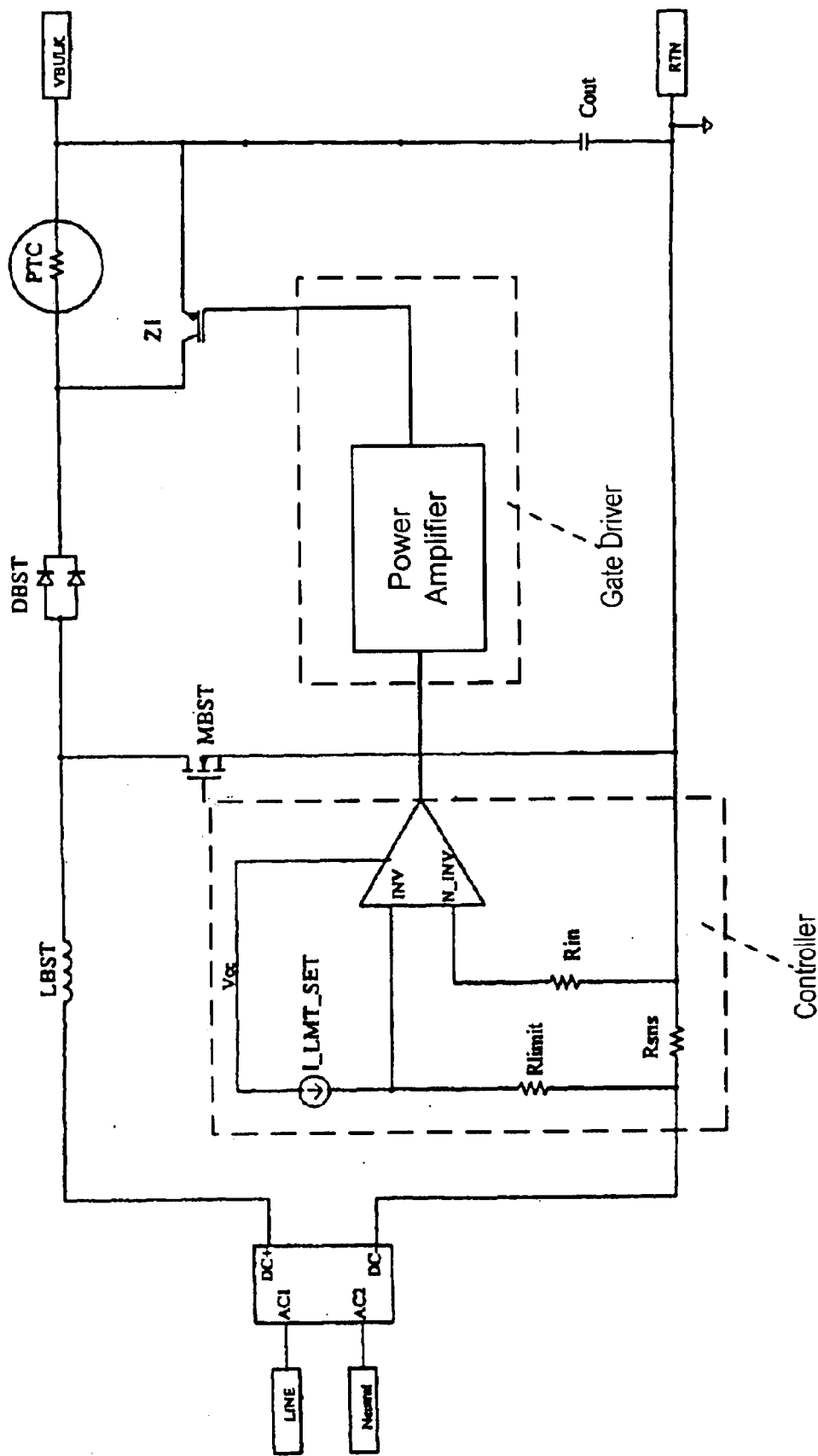
FIG. 4C is a schematic diagram, partly in block diagram form of another implementation of the invention shown in FIG. 3.
Figure 4D:
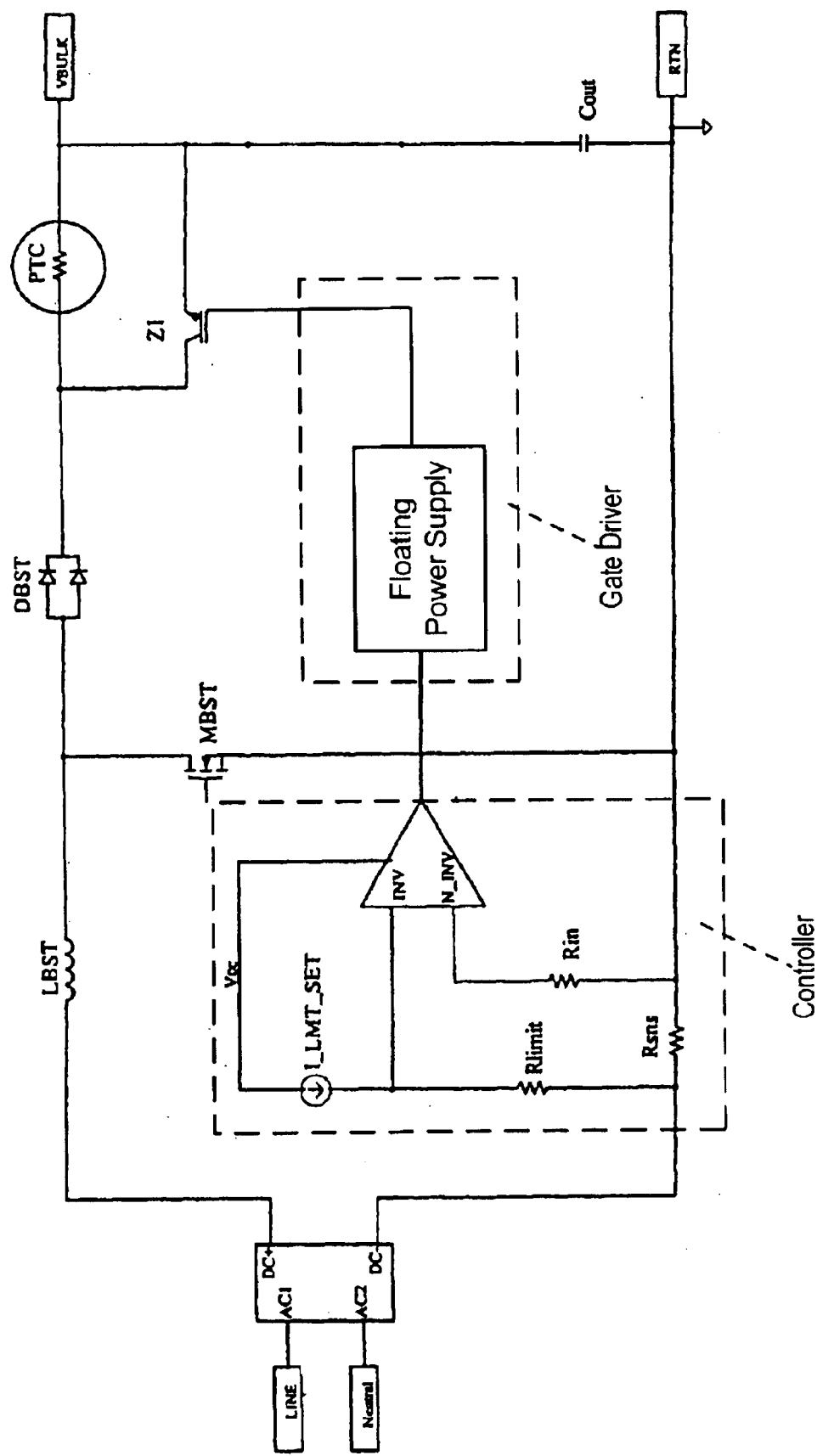
FIG. 4D is a schematic diagram, partly in block diagram form of yet another implementation of the invention shown in FIG. 3.

The gate driver for the IGBT can include a power amplifier (FIG. 4C) or a floating power supply (FIG. 4D). Each is known in the art.

Figure 5:
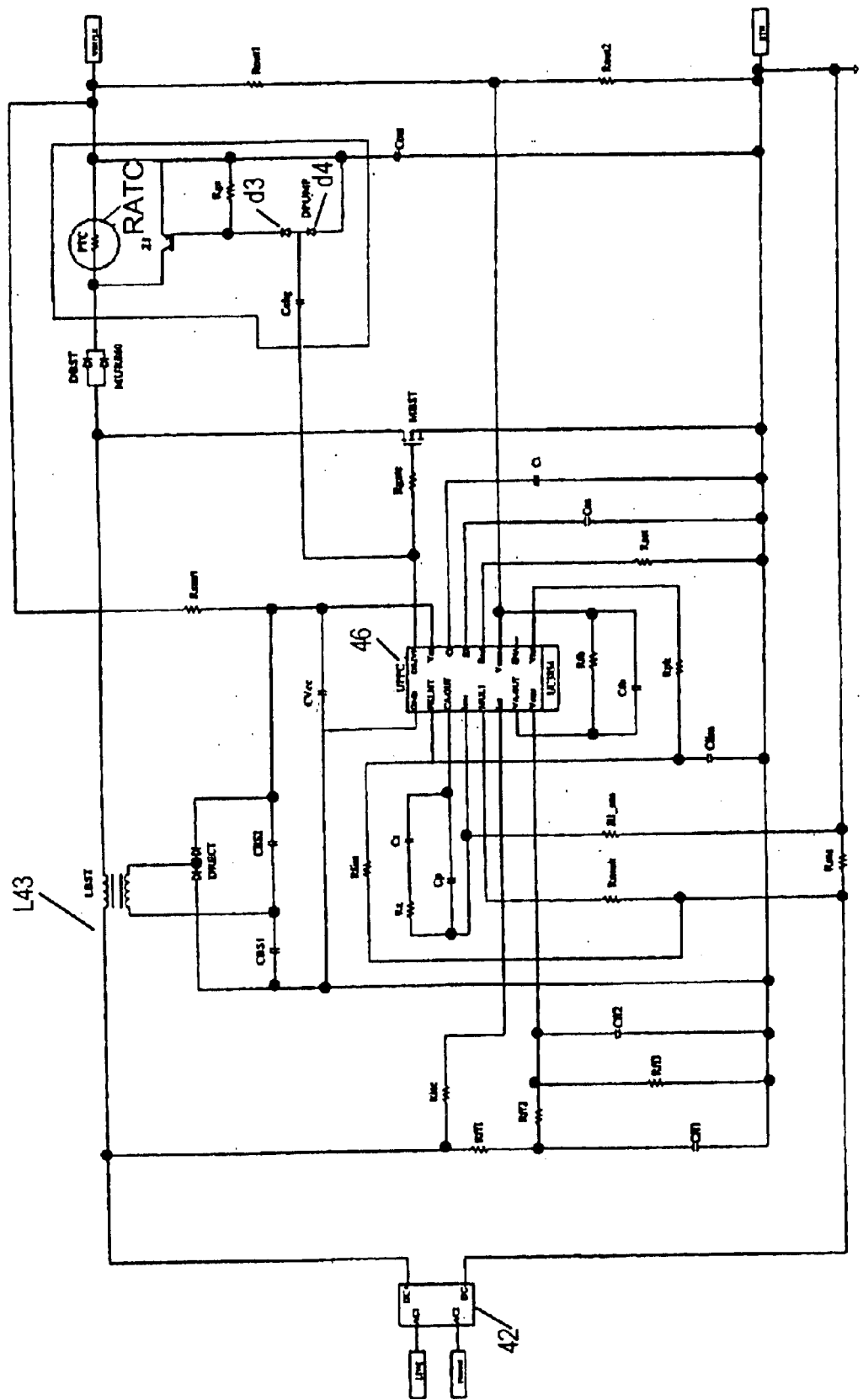
FIG. 5 is a detailed circuit schematic a high power factor pre-regulator including inrush control features of the present invention.
Figure 6:
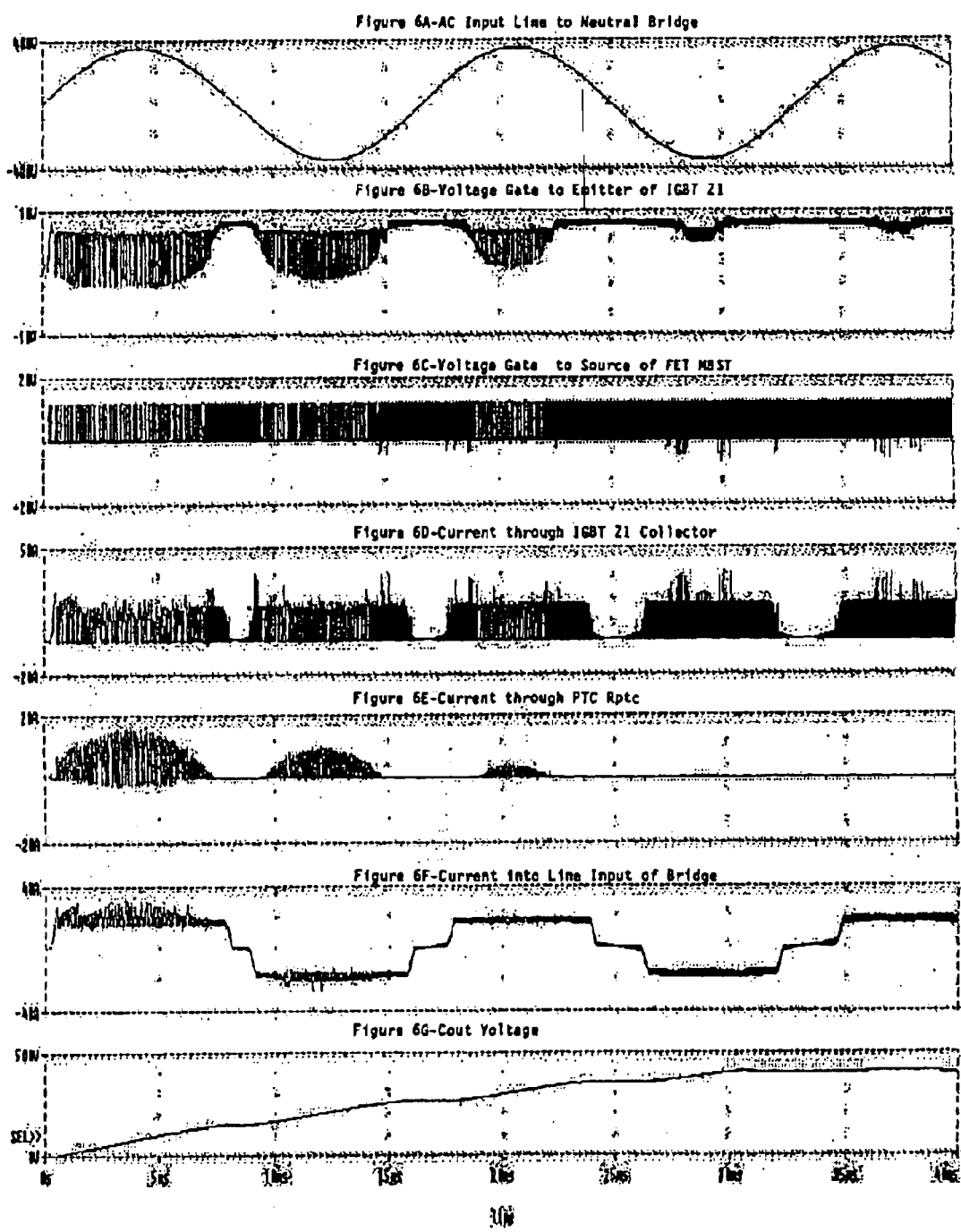
FIGS. 6A–6G represent waveforms of certain points shown in FIG. 5.

Referring now to FIG. 5 there is shown a detailed IGBT based inrush current control circuit implementing features of the current invention in a power factor control circuit. For example purposes the power factor correction controller IC is represented as the UNITRODE™ UC3854 and is shown in FIG. 5 as UPFC 46. It will be readily appreciated that many other UPFC controllers have the same or similar functions of the UC3584 and would be suitable for implementation of the present invention. Referring to FIG. 5, the IC UPFC 46 contains control functions required to achieve high power factor within Boost AC/DC converters. Additionally, the IC UPFC 46 also incorporates protection functions for power limiting and most important to inrush control, peak current limiting. The IGBT Z1, controlled by the IC UPFC 46, is placed in the path of least average current, the output path, allowing the dissipation to be minimized. The IGBT gate voltage potential is raised by the DRIVE output of the UPFC IC driving the charge pump circuit comprising D3,D4, and Cchg. During normal operation, the IGBT Z1 is driven full on and bypasses the PTC limiting resistor. A PTC is chosen for its failsafe ability during extreme overload and short circuit conditions. In addition, a small amount of current is continuously passed through the PTC maintaining the PTC in a warm state. Thus, in the event of excessive cycle drops or short circuit conditions where the IGBT Z1 is turned off, the PTC is able to reach its maximum resistance in a shorter time than it would if the PTC was starting from a cold state.

Figure 7:
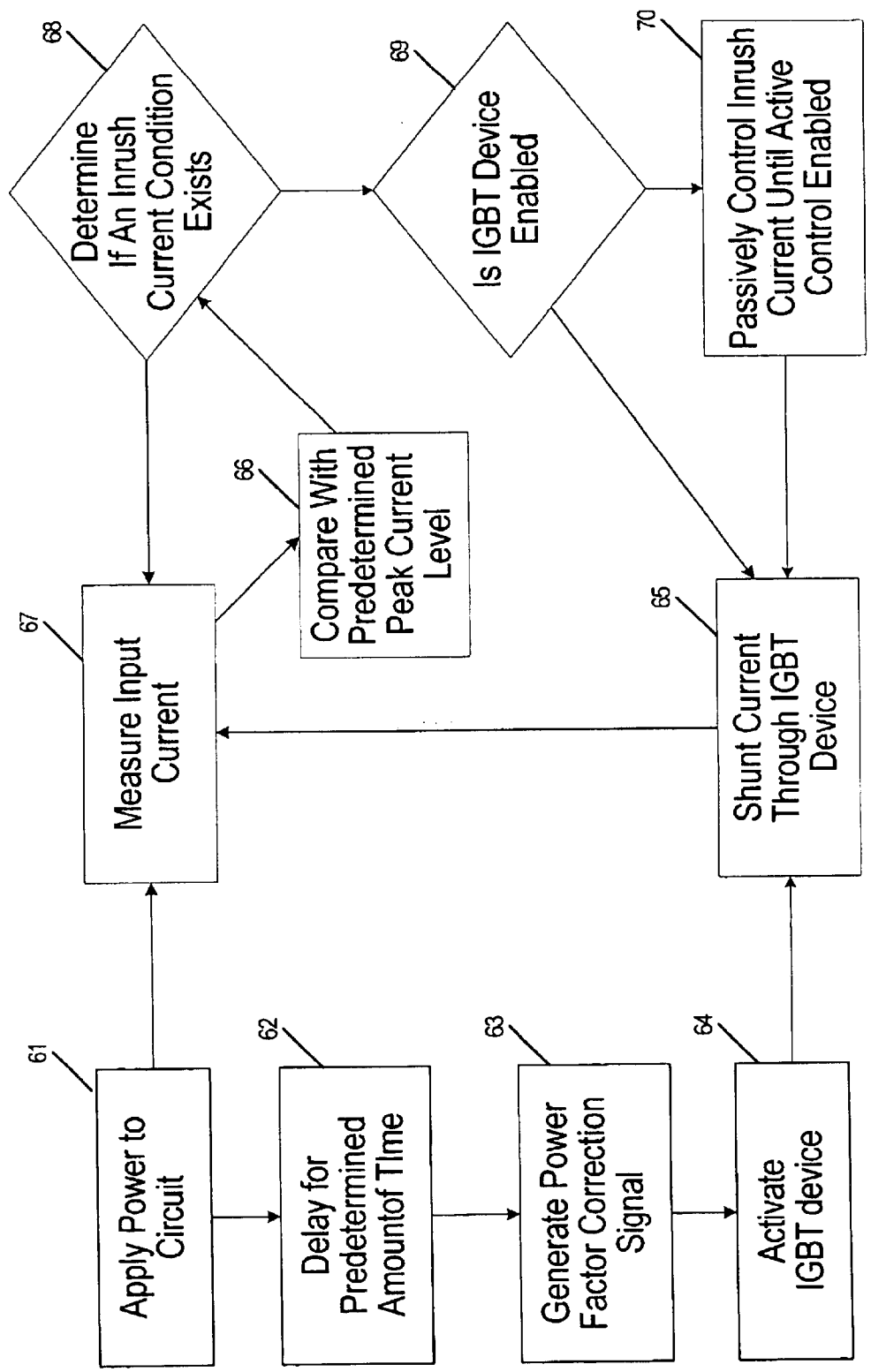
FIG. 7 is a method flowchart showing the steps for controlling inrush current in the circuit shown in FIG. 4.

Referring now to FIG. 5 and FIG. 7, when AC Mains are first applied 61, the Bulk Capacitor, Cout is discharged. The PFC Control IC UPFC 46 is off and no switching by IGBT Z1 occurs. Input current flows through the bridge 42, the boost inductor L43, and the PTC resistor Rptc. As current flows through the PTC Rptc, the output voltage charges Cout and current charges the VCC capacitor CVcc to an Under Voltage Lockout point on the PFC control IC UPFC 46, allowing IC UPFC 46 to function. The input current is continuously monitored 67 and compared to a predetermined 66 peak current level. The comparison determines the switching action of IC UPFC 46. This switching action constitutes the on-off drive for the active inrush device 65. If an inrush condition exists and the IGBT Z1 device has not been enabled 69 the inrush current will be controlled 70 by shunting current through the passive PTC device Rptc. If the instantaneous input current exceeds a predetermined value, the sensed current in Rsns will cause the PFC control IC UPFC 46 to reach current limit. This removes the drive at pin 16 of PFC control IC UPFC 46 which in turn removes the drive to the charge pump circuit d3,d4, and Cchg, allowing the gate of the IGBT Z1 to discharge and begin to turn-off. When the IGBT Z1 begins to turn-off, the current in the sense resistor starts to drop and IC UPFC 46 will come out of current limit. It is important to note that the IGBT Z1 current does not necessarily fall to zero for the current to be low enough for the IC UPFC 46 to come out of current limit. The IGBT Z1 will operate essentially in the linear region during start up. The IGBT Z1 collector current will be modulated around the input current limit point. Delays in the response of the current limit circuit and the discharge of IGBT Gate Capacitance force the IGBT to operate in a linear mode. The current limit point can be set for any current level between the maximum input current under normal operation and a predetermined inrush specification level. During start up the IC UPFC is delayed 62 due to inherent start-up delay will keep the IGBT out of the circuit until most of the inrush is completed. After the delay the IC UPFC generates 63 the PFC signal which is also used to activate 64 the IGBT Z1 device. The IGBT will then turn-on and provide a low impedance path to the output shunting 65 substantially most, but not necessarily all, of the current around the passive PTC resistor Rptc. If the power is cycled, the IGBT Z1 will quickly respond to an over current condition.

The present invention advantageously exploits the delay circuitry of a power factor control circuit before substantially simultaneously turning on power factor correction and an active resistive device such as the IGBT; thus permitting substantial charging of the output capacitor Cout before the IGBT is turned on. It is also an advantage of the present invention that using the control signal from the power factor control circuit to actuate both the active device and the power factor control circuit minimizes circuit components ordinarily necessary to drive the IGBT gate. In addition, the present invention overcomes the problems of slow relay response times described in the prior art, and the problem of the high forward voltage drop associated with SCR based inrush current control.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for controlling inrush current in a power factor correction control circuit, the method comprising the steps of:
   determining if an inrush current condition exists;
   based upon a determination that an inrush current condition does exist then passively controlling inrush current with a passive device for a predetermined amount of time;
   generating a power factor control signal; and
   implementing the power factor control signal to actively control the inrush current, wherein the step of actively controlling the inrush current shunts output current around the passive device and through an active device.

2. A method as in claim 1 wherein the step of passively controlling inrush current further comprises the step of passing current through a passive device, the passive device resistance having a positive temperature coefficient (PTC).

3. A method as in claim 1 wherein the step of generating the power factor control signal further comprises the steps of:
   charging at least one power capacitor to a predetermined voltage level; and
   enabling at least one integrated circuit associated with the at least one capacitor.

4. A method as in claim 3 wherein the step of enabling further comprises the steps of:
   determining an input current;
   comparing the input current with a predetermined current level; and
   disabling the integrated circuit if the input current exceeds the predetermined level.

5. A method as in claim 1 wherein the step of shunting current around the passive device and through the active device further comprises the step of substantially shunting the output current through an insulated gate bipolar transistor (IGBT).

6. A power supply for controlling inrush current in a power factor correction control circuit, comprising:
   means for determining if an inrush current condition exists;
   means for passively controlling inrush current with a passive device for a predetermined amount of time, based upon a determination that an inrush current condition does exist;
   means for generating a power factor control signal; and
   means for implementing the power factor control signal to actively control the inrush current, wherein the means for implementing the power factor control signal to actively control the inrush current comprises means for shunting output current around the passive device and through an active device.

7. The power supply as in claim 6, wherein the means for passively controlling inrush current further comprises means for passing current through a passive device, the passive device resistance having a positive temperature coefficient (PTC).

8. The power supply as in claim 6, wherein the means for generating the power factor control signal further comprises:
   means for charging at least one power capacitor to a predetermined voltage level; and
   means for enabling at least one integrated circuit associated with the at least one capacitor.

9. The power supply as in claim 8, wherein the means for enabling further comprises:
   means for determining an input current;
   means for comparing the input current with a predetermined current level; and
   means for disabling the integrated circuit if the input current exceeds the predetermined level.

10. The power supply as in claim 6, wherein the means for shunting current around the passive device and through the active device further comprises means for substantially shunting the output current through an insulated gate bipolar transistor (IGBT).

* * * * *